United States Patent [19]

Williams et al.

[11] Patent Number: 4,950,634

[45] Date of Patent: Aug. 21, 1990

[54] METHOD FOR PRODUCING DUAL ZONE MATERIALS BY USE OF AN ORGANOSILANE MIXTURE

[75] Inventors: Dwight E. Williams; Thomas J. Tangney, both of Midland, Mich.

[73] Assignee: Dow Corning Corporation, Midland, Mich.

[21] Appl. No.: 248,893

[22] Filed: Sep. 22, 1988

Related U.S. Application Data

[63] Continuation-in-part of Ser. No. 154,754, Feb. 11, 1988.

[51] Int. Cl.$^5$ .................. B01J 20/32; B01J 20/22; B01D 15/08; B32B 5/14
[52] U.S. Cl. .................. 502/401; 55/386; 210/198.2; 210/198.3; 210/656; 427/387; 428/405
[58] Field of Search .............. 502/401–404, 502/5, 150, 158, 159; 55/386; 210/198.2, 198.3, 656; 252/184; 427/54.1, 387; 428/405

[56] References Cited

U.S. PATENT DOCUMENTS

| | | |
|---|---|---|
| 3,207,699 | 9/1965 | Harding et al. |
| 3,839,395 | 10/1974 | Otsuka . |
| 3,960,720 | 6/1976 | Porath . |
| 3,984,349 | 10/1976 | Meiller et al. |
| 4,061,503 | 12/1977 | Berger et al. |
| 4,062,693 | 12/1977 | Berger . |
| 4,105,465 | 8/1978 | Berger . |
| 4,233,366 | 11/1980 | Sample, Jr. et al. |
| 4,298,500 | 11/1981 | Abbott . |
| 4,324,689 | 4/1982 | Shah . |
| 4,379,931 | 4/1983 | Plueddemann . |
| 4,539,399 | 9/1985 | Armstrong . |
| 4,540,486 | 9/1985 | Ramsden . |
| 4,544,485 | 10/1985 | Pinkerton . |
| 4,624,932 | 11/1986 | Bogoch . |
| 4,675,384 | 6/1987 | Dromard et al. |
| 4,696,745 | 9/1987 | Itagaki et al. |
| 4,778,600 | 10/1988 | Williams ............ 210/198.2 |
| 4,782,040 | 11/1988 | Revis et al. ............ 502/401 |

OTHER PUBLICATIONS

Boksanyi et al, *Advances in Coll. and Int. Sci.,* vol. 6 (1976), pp. 95–132.
Chang, "High Speed Ion Exchange Chromatography of Proteins", *Anal. Chem.,* vol. 48, No. 13, Nov. 1976, pp. 1839–1845.
Chmielowiec et al., *J. of Coll. and Int. Sci.,* vol. 94, No. 2, Aug. 1983.
Hagestam et al, "Internal Surface Reversed-Phase Silica Supports for Liquid Chromatography," *Analytical Chem.,* vol. 57, 1985, pp. 1757+.
Hagestam et al, "Internal Surface Reversed-Phase Silica Support Prepared with Chymotrypsin," *Journal of Chrom.,* vol. 351, 1986, pp. 239–248.
Hertl et al., *J. Phys. Chem.,* vol. 75, No. 14, 1971.
Hunnicutt et al., "Reactivity of Organosilane Reagents on Microparticulate Silca", *Anal. Chem.,* vol. 58, 1986, pp. 748, 752.
Marshall et al., "Synthesis of LC Reversed Phases of Higher Efficiency by Initial Partial Deactivation of the Silica Surface", *Journal of Chrom. Sci.,* vol. 22, Jun. 1984, pp. 217–220.
Poole, C. F., Recent Advances in Silylation of Organic Compounds for Gas Chromatography, Chap. 4, King, Heyden, London, 1977, pp. 152–200.
Snyder et al, *Intro to Modern Liq. Chrom.,* 2nd ed., Wiley Interscience, N.Y., 1979.
Szcerba et al, "HPLC Column Finds Drugs in Serum," *Research and Dev.,* Sep. 1986, pp. 84–86.
Williams et al, Silica, Surfaces to Interfaces, D. E. Leyden et al, Gordon to Brench, publishers, 1986, pp. 471ff.

*Primary Examiner*—Paul E. Konopka
*Attorney, Agent, or Firm*—Killworth, Gottman, Hagan & Schaeff

[57] ABSTRACT

Dual zone porous materials having an external zone and an internal zone are prepared by contacting a suspension of a porous support, such as particulate silica, in an aprotic solvent with an organosilane mixture of a first organosilane having first silyl groups and a second organosilane of a second type in order to form first silyl groups predominantly or the external surfaces of the porous support and second silyl groups predominantly on the internal surfaces of the porous support.

21 Claims, No Drawings

METHOD FOR PRODUCING DUAL ZONE MATERIALS BY USE OF AN ORGANOSILANE MIXTURE

CROSS-REFERENCE TO RELATED APPLICATIONS

This is a continuation-in-part of application Ser. No. 154,754, filed Feb. 11, 1988, the disclosure of which is hereby incorporated by reference. Reference is also made to copending applications Ser. No. 598,120, filed Apr. 9, 1984, now U.S. Pat. No. 4,782,040, issued Nov. 1, 1988 and Ser. No. 063,576, filed Jun. 17, 1987, now U.S. Pat. No. 4,778,600, issued Oct. 18, 1988 and assigned to the same assignee as the present invention.

BACKGROUND OF THE INVENTION

The present invention relates to a method for producing dual zone porous materials having an external zone bearing first silyL groups immobilized on the external surfaces of the porous material and internal zone having second silyl groups immobilized on the internal surfaces of the porous material and the dual zone materials so produced. More particularly, it relates to a method for contracting a porous hydroxyl-bearing support simultaneously with two different organosilanes which differentially react with the external and internal hydroxyl groups on the porous support and production thereby of a dual zone material.

In copending applications Ser. No. 154,754 and Ser. No. 598,120, there are disclosed dual surface (more properly termed dual zone) porous materials made by treating a porous hydroxyl-bearing support, such as porous silica, alumina, zirconia, etc., with substoichiometric amounts of an ultrafast silylating agent. This agent is chosen from those which are so reactive that the resulting surface group is immobilized in the external zone of the porous support before the agent has had time to migrate deeply into the porous internal zone. A subsequent silylation reaction can be employed to convert residual hydroxyl groups, which reside predominantly in the internal zone, to a second immobilized group of another type. See also, Williams & Tangney, *Silanes, Surfaces & Interfaces*, D. E. Leyden, ed., Gordon & Breach Publisher, 1986, P. 471 ff.

In copending application Ser. No. 598,120, the disclosed ultrafast silylating agents are reactive silane intermediates. In patent application Ser. No. 154,754 the ultrafast silylating agents are silanes having "leaving groups" such as (i) substituted amides, (ii) substituted amines, or (iii) thioethers. It is believed that these facile leaving groups lower the activation energy required for reaction with surface hydroxyl groups and thus enhance the extent to which the silane can be captured by covalent bond formation in the external zone of the porous material, that is, captured early during its diffusion path into said material.

As stated in copending applications Ser. No. 154,754 and Ser. No. 598,120, traditional silylation reactions are generally not fast enough to permit preferential silylation of the external surface of the porous support. "Traditional silylation" is described in Plueddemann, *Encyclopedia of Chemical Technology*, 3rd ed., Vol. 20, page 962 et seq. Plueddemnn states that silylation is the displacement of active hydrogen from an organic molecule by silyl groups where "The active hydrogen is usually OH, NH, or SH, and the silylating agent is usually a trimethylsilyl halide or a nitrogen-functional compound. A mixture of silylating agents may be used; a mixture of trimethychlorosilane and hexamethyldisilazane is more reactive than either reagent alone, and the by-products combine to form neutral ammonium chloride".

Neither consecutive nor simultaneous treatment of porous supports with two such traditional silylating agents has produced a dual zone porous material of the type described in parent application Ser. No. 654,754. For example, Abbott in U.S. Pat. No. 4,298,500 discloses sequentially treating a porous silica gel with an organosilane reagent to form a "first residue" and, then, an organosilane-containing diol, diol precursor or amide to form a "second residue". However, the resulting product is a mixed phase composition which shows negligible dual zone characteristics.

Likewise, Marshall et al. in "Synthesis of LC Reversed Phases of Higher Efficiency by Initial Partial Deactivation of the Silica Surface". *Journal of Chromatography Science*, Vol. 22, June 1984 pp. 217-220, disclose first treating silica with a small amount of end-capping reagent (such as trimethylchlorosilane) followed by exhaustive octadecylation. Again the result is a homogenous distribution of surface bound molecules.

In terms of simultaneous treatment with a mixture of reactants reference is made to the Plueddemann publication mentioned above and the M. L. Hunnicutt and J. M. Harris, "Reactivity of Organosilane Reagents on Microparticulate Silica", *Anal. Chem.*, Vol. 58, Apr. 1986, pp. 748-752. Hunnicutt and Harris discuss the results of competitive surface reactions between binary organosilane mixtures and silica gel. The organosilane mixtures used include mixtures of two haloalkylsilanes such as (1-bromomethyl)dimethylmonochlorosilane, (1-chloromethyl)dimethylmonochlorosilane, or (3-chloropropyl)dimethylmonochlorosilane, as well as mixtures of a haloalkylsilane with an alkysilane such as trimethylchlorosilane (TMCS) or hexamethyldisilazane (HMDS). In a number of instances a catalyst such as pyridine was added to the silica slurry prior to silane addition for base catalyzed reactions. Hunnicutt and Harris showed that their reaction did not display pore diffusion control. Thus they could not have produced dual zone materials (DZMs) with respect to differential distribution of their chosen immobilized groups. This outcome is believed to be due to several factors. Most importantly, mixtures of chlorosilanes of the type used by Hunnicutt and Harris do not react with sufficient speed and differentiality even when the reaction is catalyzed with pyridine.

Furthermore, the reaction conditions were not adjusted so as to produce DZMs even from the point of view of selective capture of both chlorosilanes together in the external zone. Firstly, the solvent they used was chloroform which is highly polar and is known to be a proton donor in hydrogen-bonded complexes. Such solvents have been found to reduce pore diffusion control, probably by sequestering the surface reactive sites (silanol) and thus slowing down the reaction rate. Protic solvents such as ethanol are even more deleterious since the halosilane is solvolyzed and transformed into the less reactive ethoxysilane. Secondly, the rate of silane addition to the silica slurry was excessively fast at about 0.3 ; molecules/$nM^2$/minute. Accordingly, individual silica particles would be subjected to unusual doses of silane and the resultant particle-to-particle heterogeneity would overcome any intraparticle inhomogeneity (dual zone structure) that might otherwise occur. Accordingly, even though Hunnicutt and Harris conducted what could be described as a mixed halosilane reaction, Hunnicutt and Harris do not teach one of ordinary skill in the art how to produce dual zone materials by means of such reaction mechanisms.

And yet, it is known to be desirable to produce dual zone porous materials having silyl groups of one type predominantly on the external surface and silyl groups of another type predominantly on the internal surface in order to provide on the external and internal surfaces differentially selective adsorbents, for example, for specific chromatographic and catalytic applications. It would also be desirable to use a mixture of organosilanes because of the ease and lower cost involved. To date, however, it has not been possible to do so.

Accordingly, the need remains for a method for simultaneously contacting a porous hydroxyl-bearing support with a mixture of organosilanes in the production of dual zone porous materials.

SUMMARY OF THE INVENTION

That need is met by the present invention which utilizes a mixture of organosilanes of a specific type under defined reaction conditions in order to produce a dual zone porous material. The mixture includes a first and a second organosilane. The first organosilane has first silyl groups such as haloalkylsilyl, vinylalkylsilyl, and aminoalkylsilyl groups, and has a leaving group such as an alkyl or aryl sulfide, di-substituted catalyzed non-fluorine halogen groups or substituted amido group, which is capable of rapidly reacting with the hydroxyls on the external surfaces of a hydroxyl-bearing porous support such as a porous metalloid oxide, a porous metallic oxide, or mixtures thereof (preferably in particulate form, and most preferably particulate silica). For the case of non-fluorine halogen leaving group the reaction must be catalyzed as in copending application Ser. No. 248,737 submitted on even date herewith.

The second organosilane has second silyl groups such as trimethylsilyl or dimethyl alkyl silyl groups and is capable of diffusing into the interior of the porous support. It has a leaving group such as an alkoxy, siloxy, carboxy, or chloro group which will not substantially exchange with the leaving group of the first organosilane, but which will react slowly with the hydroxyls on the internal surfaces of the porous support. For the chloro leaving group case on the second organosilane the reaction must not be catalyzed as in copending application Ser. No. 248,737.

In the mixture, the first organosilane should be present in a substoichiometric amount, i.e. less than the stoichiometric equivalent based on the reactable hydroxyl content of the porous support. On the other hand, the second organosilane can be in any convenient amount. The sum of the amounts of both silanes need not be sufficient to treat all of the internal and external reactive silanols (silica case). The material may be used as is, or the residual reactive silanols may be converted to additional individualized group by subsequent silane additions.

The organosilane mixture is added to a porous support suspension formed by mixing the porous support with a solvent. The preferred solvent is an aprotic solvent. Most preferred are non-polar solvents such as hexane, octane, decane, toluene, or mixtures thereof since such non-polar solvents will not retard the reaction rate due to their minimal interaction with the surface reactive sites.

The organosilane mixture is added at a rate which is rapid with respect to the reaction rate of the second organosilane, but slow with respect to the rate of mixing of the suspension with the organosilane mixture. Generally, the organosilane mixture is itself predissolved in the same solvent as is used for the suspension in order to facilitate said slow addition.

The organosilane mixture is maintained in contact with the porous support for a sufficient period of time to permit formation of first organosilyl groups predominantly on the external surfaces of the porous support and to permit formation of second organo silyl groups predominantly on the internal surfaces of the porous support. Thereafter, the dual zone porous material may be isolated by conventional separation techniques, such as filtration.

The result is a dual zone porous material having organo silyl groups of the first type predominantly in the external zone and second organosilyl groups predominantly in the internal zone.

Actually, the amount of surface area of the porous support which is considered to be in the external zone versus the amount considered to be in the internal zone may vary. Preferred for purposes of this invention is the situation where the internal zone approximately comprises the internal 90 percent of the surface area and the external zone approximately comprises the external 10 percent of the surface area of the porous material. Use of a larger amount of first organosilane will result in a greater degree of penetration into the interior of the porous support, will cause reaction with a greater number of hydroxyl groups on the surfaces of the porous support, and will create a larger external zone occupying a greater percentage of the surface area of the porous support. Thus, the external zone may range from 0.5% to 50% of the surface area and the internal zone may range from 50–99.5% of the surface area.

In any event, it is possible to control by selection of the organosilanes used in the mixture and the reaction conditions the size of the external zone formed. This enables one to produce dual zone materials having varying degrees of capacity for separation, such as for use as packing materials in liquid chromatography, or otherwise.

Accordingly, it is an object of the present invention to provide an improved method for production of dual zone porous materials by simultaneous application of a mixture of organosilanes. Other objects and advantages of the invention will become apparent from the following detailed description and the appended claims.

DETAILED DESCRIPTION OF THE PREFERRED EMBODIMENTS

The porous materials found useful in this invention are those materials which are porous solids having hydroxyl groups on their surfaces. Such materials for example are silica, silica gel, alumina, stannia, titania, zirconia, and the like. Also, these materials can be porous glass, porous ceramic or plastic as long as the material has, or will form, hydroxyl groups on its surface.

The form of the porous material is not overly critical. Particulate porous materials, as well as filaments, slabs, discs, blocks, spheres, films and other such forms can be used in this invention. Also contemplated within the scope of this invention is the treatment of particulate materials by the process of this invention, and the subsequent forming of the treated particulate materials into slabs, discs, blocks, spheres, films, membranes, sheets, and the like.

Preferred for this invention are the porous metalloid oxides, metallic oxides or mixtures thereof such as silica, alumina, zirconia and titania in all of their related forms. Most preferred are particulate silicas which may vary in pore diameter from 50 to 2000 angstroms and in particle size from 3 to 1000 micro-meters, for example.

As mentioned, the first step in the production of the dual zone porous material of the present invention is forming a suspension of the porous support in a solvent. The solvent is preferably an aprotic solvent and most preferably a non-polar solvent, for example, hexane, octane, decane, toluene or mixtures thereof. Preferably, porous silica particles having a particle size of from 3 to 1000 micro-meters are mixed with the solvent in the amount of 0.1% to 40 w/v%.

The organosilane mixture is slowly added to this suspension. Preferably the mixture is a solvent-based one, using the same solvent as that used in the porous support suspension. The rate of addition must be adjusted to be faster than the reaction rate of the second organosilane but sufficiently slower than the rate of mixing with the suspension particles to receive a uniform dose of the said first organosilane.

The first organosilane in the mixture preferably has the formula:

$$L_m Si(R'')_{3-m} R$$

wherein L is a catalyzed non-fluorine halogen group as in copending DOC 005 PA, or is $NR_2^{IV}$ or an $R^{IV}$-substituted sulfide or amido group wherein $R^{IV}$ is methyl, ethyl, phenyl, $Si(R')_{3-m}R$, or, when L is $NR_2^{IV}$, $R^{IV}$ may be a cyclic amino group such as imidazoyl or piperidinyl, m is 1–3, R'' methyl, ethyl, or phenyl, and R is selected from hydrogen, allyl, vinyl, and Q wherein Q is (a) alkyl groups having less than twenty carbon atoms,
(b) aryl groups having less than twenty carbon atoms,
(c) —$CH_2CH_2C_nF_{2n+1}$ wherein n is 1 or more,
(d) —$CH_2C_pH_{2p}CH_2SR'$,
(e) —$CH_2C_pH_{2p}CH_2NR'_2$,
(f) —$CH_2C_pH_{2p}CH_2N(R')(CH_2)_2N(R')_2$.

(g) —$CH_2C_pH_{2p}CH_2OCH_2CHCH_2$ 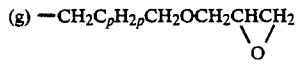

(h) —$(CH_2)_2$— 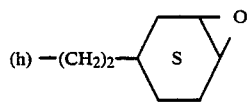

(i) —$CH_2C_pH_{2p}CH_2OC(O)C(CH_3)\!=\!CH_2$ or (j) —$CH_2C_pH_{2p}CH_2$ 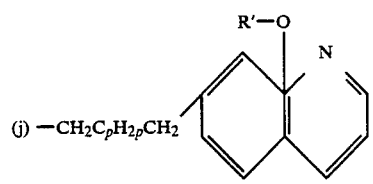

(k) —$CH_2C_pH_{2p}CH_2O(CH_2CH_2O)_aZ$ wherein Z is an alkyl or aryl hydrocarbon having less than seven carbon atoms or is acetyl or is the group

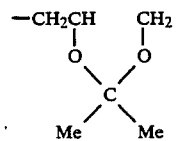

wherein Me is methyl and wherein "a" is 0–10.

(l) $CH_2C_pH_{2p}CH_2X$ wherein X is a halogen, R' is methyl, ethyl or phenyl and p is 1 or 2.

The preferred leaving group is either an N-methylacetamido group or a silyimine and the preferred silyl portion of the compound is haloalkylsilyl, vinylalkylsilyl, or aminoalkylsilane. A preferred first organosilane is

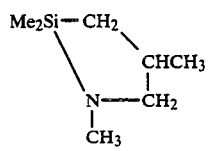

Fluoroalkylsilanes are also preferred in that they can be used to produce a dual zone porous material having fluoroalkylsilyl groups in the external zone. The fluoroalkylsilyl groups serve as a lipophobic phase which is less adsorptive to proteinaceous substances when the dual zone porous material is used as a reverse phase packing material for high-pressure liquid chromatographic blood serum analysis as disclosed in copending application Ser. No. 063,576, filed June 17, 1987, the disclosure of which is hereby incorporated by reference.

The second organosilane in the mixture preferably has the formula $$L_m Si(R'')_{3-m} R$$

wherein L is alkoxy, siloxy, carboxy, or uncatalyzed halogen, as described in copending DOC 006 PA, R'' is as defined above, m is 1–3, and R is as defined above, and wherein L, m, R'', and R are chosen so that the second organosilane is not the same as the first organosilane. The preferred leaving group is an acetoxy group and the preferred silyl portion of the second organosilane is trimethylsilyl or dimethylalkylsilyl.

The amounts of first organosilane and second organosilane used in the mixture vary depending on the amount and hydroxyl content of the porous support found in the suspension. In any event, the amount of first organosilane used should be less than a stoichiometric equivalent of the reactable hydroxyl content of the porous support present and the amount of second organosilane used should be any convenient amount, depending on how much residual reactable hydroxyl one may wish to leave in the material. Preferably the first organosilane is used in an amount varying from 0.05 to 2.0 m/nM², i.e. molecules of organosilane per square nanometer of surface area of the porous support, and the second organosilane is used in an amount exceeding 0.05 m/nM².

As mentioned, the organosilane mixture is added to the porous support suspension at a rate which is rapid with respect to the reaction rate of the second organosilane, but slow with respect to the rate of mixing of the suspension with each aliquot of said mixture. Acceptable addition rates must be determined empirically for each organosilane mixture. Preferably, however, the addition is completed within 8 hours.

Thereafter, the organosilane mixture is maintained in contact with the porous support for generally from about 10 minutes to 24 hours, and preferably from about 1 to 6 hours. The temperature during this step of the process is not narrowly critical and can range from 0° C. to 400° C. Most preferred is the reflux temperature of the reaction at about 70° C. to 175° C.

The amount of first organosilane present in the mixture will determine the depth of external zone produced in the dual zone porous material. Generally, the external zone can be zone can be the exterior 0.5% to 50% of the surface area of the porous support. However, there are often minor differences between the external and the average surface composition due to random scatter in analytical results. Furthermore, real differences between two compositions must be large enough to significantly affect properties of the material. In view of these considerations, meaningful dual zone character is attained only when either of the following conditions are met:

(a) $\dfrac{\Gamma_1(E)}{\Gamma_1(A)} \geq 1.5$, $\Gamma_1(E) \geq 0.3$ molecules/nM$^2$, and $\Gamma_2(A) \geq 0.1$ molecules/nM$^2$ (b) $\dfrac{\Gamma_1(E)}{\Gamma_1(A)} > 1.5$, $\Gamma_1(E) \geq 15\%$ of saturation of the surface of the porous material; and $\Gamma_2(A) \geq 5\%$ of saturation of the surface of the porous material wherein $\Gamma(E)$ is the external surface density in Molecules/nM$^2$ as inferred by Electron Spectroscopy Chemical Analysis, and wherein $\Gamma_1(A)$ and $\Gamma_2(A)$ are like measurements of average surface density measured by bulk analysis, and wherein subscripts 1 and 2 refer to the groups immobilized in reaction with the first organosilane and, then, with the second organosilane respectively.

Concentration is expressed in appropriate units such as molecules per square nanometers (m/nM$^2$).

$$\Gamma_1(A) = \dfrac{6 X_1}{10 S} 10^6$$

$$\Gamma_1(E) = \dfrac{R_1(E)\Gamma_1^o(A)}{R_1^o(A)}$$

$$R_1(E) = A_j/A_r$$

where $X_1$ is the amount of some group (labeled 1) as measured in moles per gram of silica by bulk elemental analysis, S is the specific surface area expressed in square meters per gram of silica and $R_1(E)$ is the ESCA-measured ratio of the surface atomic composition of element j, $A_j$, to that of element r, $A_r$. Element j is chosen to be unique to group 1, and element r is chosen to come primarily from the porous substrate. Silicon was chosen as the reference element, r, since the contribution to $A_{Si}$ by the immobilized silane is relatively small. The analogous quantities, $\Gamma^o_1(A)$ and $R^o_1(A)$, are found by measurements on a silica possessing immobilized group #1 that does not have a compositional gradient. Such materials are easily prepared by exhaustive treatment with a single silylating agent.

Such exhaustive treatment also defines the amount of reactable hydroxyl initially present in the porous substrate. This amount is dependent on the size of the immobilized organosilyl group as well as the reaction temperature.

When it is determined that the reaction is essentially finished, the product is typically isolated from the reaction mixture. Thus, the final step of this process is the isolation of such products from the reaction mixture. This can be accomplished in a number of ways. For example, the liquid can be decanted, the porous material washed and the liquid decanted, successively, or the reaction mixture can be filtered to remove the liquid from the solid product. If the final product is other than particulate in form, it can be used as is or it can be further shaped and formed without losing beneficial properties. If the material is in a particulate form it can be used as is or it can be compressed, sintered, or otherwise formed.

So that those skilled in the art may appreciate and understand the invention described herein, the following examples are offered for illustration purposes only. The examples should not be construed as limiting the invention as defined in the claims.

I. Preparation of —SiMe$_2$CH$_2$CH$_2$CF$_3$/—SiMe$_3$ dual zone material 1.00 g (1.196×10$^{-3}$ eq. OH @ 2.4 OH/nM$^2$) dry Baker silica gel and 100 cc decane were added to a 250 cc round bottomed flask equipped with a thermometer, an air motor driven paddle, an addition funnel and a condenser topped with an N$_2$ sweep. This mixture was heated to 60° C. 15 microliters (6.975×10$^{-5}$ eq. or 0.14 molecules/nM$^2$) of CF$_3$CH$_2$CH$_2$Me$_2$SiN(Me)C(O)Me (TFSA) in 15 cc decane and 0.39 cc (2.65×10$^{-3}$ eq. or 5.3 molecules/nM$^2$) of Me$_3$SiOAc in 15 cc decane were then mixed with the addition funnel and added to the reaction flask over two minutes with vigorous stirring (Me represents the methyl group). The reaction mixture was then heated at solvent reflux (170° C.) for three hours without any additional stirring. After cooling the silica was isolated from the solution via filtration and washed once with the decane and three times with ethyl ether. Finally, the silica was dried in a vacuum oven for four hours at 80° C. prior to ESCA and bulk elemental analysis. Bulk analysis gave values of 0.16 wt. % F. and 3.76 wt. % C., corresponding to average surface concentrations of 0.07 m/nM$^2$ for —SiMe$_2$CH$_2$CH$_2$CF$_3$ and 2.11 m/nM$^2$ for —SiMe$_3$. External surface analysis by ESCA gave a value of 0.0689 F/Si, corresponding to a concentration at the external surface of 0.36 m/nM$^2$ for —SiMe$_2$CH$_2$CH$_2$CF$_3$. The values of 300 M$^2$/g for the specific surface area of the silica was used to convert bulk analytical values to average surface concentrations. Calculation of the external surface concentration was made using reference values of 0.41 F/Si (by ESCA) and 5.19 wt. % F corresponding to 2.16 m/nM$^2$ of the bound group. These values were obtained for silica that had been thoroughly treated to saturation by vapor phase TFSA so that no concentration gradient was present.

The surface concentration of the trifluoropropyl group for the exterior was 0.36 m/nM$^2$ i.e., five times greater than for the average and the average for trimethyl group was 2.11 m/nM$^2$, proving that a dual zone material had been prepared.

II. Preparation of —SiMe$_2$CH$_2$CHMeCH$_2$NHMe/—SiMe$_3$ dual zone material A material was prepared similarly to Example I. above with the following exceptions:

(1) 25 microliters (1.65×10$^{-4}$ eq. or 0.33 molecules/nM$^2$) of cyclic silylimine, having the formula Si-Me$_2$CH$_2$CHMeCH$_2$NMe was used instead of the TFSA.

(2) Octane was used as the solvent instead of decane and the reaction refluxed at 117°C.

Bulk analysis gave values of 0.10 wt. % N and 3.68 wt. % C., corresponding to average surface concentrations of 0.17 m/nM$^2$ for —SiMe$_2$CH$_2$CHMeCH$_2$NHMe and 1.86 m/nM$^2$ for —SiMe$_3$. External surface anaylsis by ESCA gave a value of 0.0146 N/Si, correponding to a concentration at the external surface of 0.33 m/nM$^2$ for the amine. Calculation of the external surface concentration was made using reference values of 0.0786 N/Si (by ESCA) and 1.07 wt. % N corresponding to 1.78 m/nM$^2$ of the bound group. These values were obtained for silica that had been treated thoroughly to saturation with excess cyclic silylimine (no concentration gradient could occur in that case).

The surface concentration of the amine for the exterior was 0.33 m/nM$^2$, i.e., two times greater than for the average and the average for the trimethyl group was 1.86 m/nm$^2$, proving that a dual zone material had been sucessfully prepared. An earlier preparation of this material, made using a less preferred Teflon coated magnetic bar for stirring (which is thought to degrade the silica particles to expose some of their interior), also proved to be a DZM. It possessed a milder concentration gradient as shown by an external surface concentration of 0.33 m/nM$^2$ and an average surface concentration of 0.20 m/nM$^2$ for the —SiMe$_2$CH$_2$CHMeCH$_2$NHMe group.

III. Preparation of —SiMe$_2$Vi/—SiMe$_3$ dual zone material

A material was prepared similarly to Example I with the following exceptions:

(1) 25 microliters (1.65×10$^{-4}$ eq. or 0.33 molecules/nM$^2$) of ViMe$_2$SiN(Me)C(O)Me was used instead of TFSA, where Vi represents the vinyl group.

(2) cc octane was used as a solvent instead of 100 cc decane.

(3) A Teflon coated stir bar was used instead of the air motor driven paddle.

The ViMe$_2$Si/Me$_3$Si dual zone material was derivatized as follows prior to spatial distribution analysis.

0.5 g of the treated silica was added to a 1 oz. vial along with 10 cc CCl$_4$ and sonicated 1 minute. 10 cc of a 2% (wt./vol.) ICl solution in glacial acetic acid was added to the vial which was shaken in the dark for 2 hours. The silica was then isolated by filtration and washed twice with CCl$_4$ and twice with ethyl ether. Finally, it was vacuum oven dried for two hours at 80° C. prior to ESCA and bulk elemental analysis.

Bulk analysis gave values of 0.31, 1.17, and 3.33 wt. % for Cl, I, and C respectively, corresponding to average surface concentrations of 0.23 m/nM$^2$ for —SiMe$_2$Vi and 1.71 m/nM$^2$ for —SiMe$_3$. External surface analysis by ESCA gave a value of 0.0258 Cl/Si and 0.0190 I/Si, corresponding to a concentration at the external surface of 0.49 m/nM$^2$ for —SiMe$_2$Vi. Calculation of the external surface concentration was made using reference values of 0.1008 and 0.0848 for Cl/Si and I/Si and using the measured values of 2.30 Cl wt. % and 9.14 I wt. % corresponding to 2.05 m/nM$^2$ for the bound group, all measured for a silica which had been thoroughly treated to saturation with excess —SiMe$_2$Vi prior to the ICl derivatization reaction, (hence insuring no concentration gradient).

The external concentration of the vinyl group was 0.49 m/nM$^2$, i.e., two times greater than its average value and the average for the trimethyl group was 1.71 m/nM$^2$, proving that a dual zone material had been made.

Having described the invention in detail and by reference to the preferred embodiment thereof, it will be apparent that modifications and variations are possible without departing from the scope of the invention defined in the appended claims.

What is claimed is:

1. A method of silylating a porous material to form a silylated porous material having an external zone which comprises the external surfaces of the porous material and having an internal zone which comprises the internal surfaces of the porous material, comprising:
    (a) providing a hydroxyl-bearing porous support selected from the group consisting of porous metalloid oxides, porous metallic oxides, and mixtures thereof,
    (b) providing an organosilane mixture of
        (i) an amount less than or equal to two-thirds of a stoichiometric equivalent, based on the reactable hydroxyl content of said porous support, of a first organosilane having first organosilyl groups and having a leaving group which is capable of rapidly reacting with the hydroxyls on the external surfaces faster than said first organosilane can migrate into the interior of said porous support, and
        (ii) more than 0.05 molecules per square nanometer of surface area of said porous support of a second organosilane having second organosilyl groups and a leaving group that will react slowly with the hydroxyls on the internal surfaces of said porous support but that will not substantially exchange with the leaving group of said first organosilane, said second organosilane being capable of diffusing into the interior of said porous support,
    (c) forming a porous support suspension by mixing said porous support with a solvent,
    (d) adding said organosilane mixture to said porous support suspension at a rate which is rapid with respect to the reaction rate of said second organosilane but slow with respect to the rate of mixing said suspension with said organosilane mixture,
    (e) maintaining contact between said porous support and said organosilane mixture for a time sufficient to permit rapid formation of said first organosilyl groups predominantly on the external surfaces of said porous support to form said external zone and said slow formation of said second organosilyl groups predominantly on the internal surfaces of said porous support to form said internal zone, and
    (f) subsequently isolating the so-treated porous support and thereby providing said silylated porous material.

2. The method of claim 1 wherein said porous support is particulate silica.

3. The method of claim 2 wherein said solvent is an aprotic solvent.

4. The method of claim 2 wherein said solvent is a non-polar solvent.

5. The method of claim 2 wherein said solvent is selected from the group consisting of hexane, octane, decane, toluene and mixtures thereof.

6. The method of claim 1 wherein said leaving group of said first organosilane is selected from the group consisting of alkyl or aryl sulfide, a catalyzed non-fluorine halogen, disubstituted amino, and substituted amido groups.

7. The method of claim 6 wherein said leaving group of said second organosilane is selected from the group consisting of alkoxy, siloxy, carboxy, and uncatalyzed halogen groups.

8. The method of claim 7 wherein said first organosilyl groups are selected from the group consisting of haloalkylsilyl, vinylalkylsilyl, and aminoalkylsilyl.

9. The method of claim 6 wherein said second organosilyl groups are trimethylsilyl or dimethyl alkyl groups.

10. The method of claim 2 wherein said leaving group of said first organosilane is an N-methylacetamido group.

11. The method of claim 10 wherein said leaving group of said second organosilane is an acetoxy group.

12. The method of claim 2 wherein said organosilane mixture is a solvent-based mixture.

13. The method of claim 12 wherein said solvent is an aprotic solvent.

14. The method of claim 12 wherein said solvent is selected from the group consisting of hexane, octane, decane, toluene, and mixtures thereof.

15. The method of claim 1 wherein said external zone comprises approximately 5–50% of the total surface area of said porous material and said internal zone comprises approximately 50–95% of the total surface area of said porous material.

16. The method of claim 1 wherein said dual zone porous material has conditions selected from one of the following:

(a) $\dfrac{\Gamma_1(E)}{\Gamma_1(A)} \geq$ 1.5, $\Gamma_1(E) \geq$ 0.3 molecules/nM$^2$, and $\Gamma_2(A) \geq$ 0.1 molecules/nM$^2$, or (b) $\dfrac{\Gamma_1(E)}{\Gamma_1(A)} \geq$ 1.5, $\Gamma_1(E) \geq$ 15% of saturation of the surface of the porous material, and $\Gamma_2(A) \geq$ 5% of saturation of the surface of the porous material wherein $\Gamma_1(E)$ is the external surface density in Molecules/nM$^2$ as inferred by Electron Spectroscopy Chemical Analysis, and wherein $\Gamma_1(A)$ and $\Gamma_2(A)$ are like measurements of average surface density as measured by bulk analysis, and wherein subscripts 1 and 2 refer to said organosilyl groups of said first type and said organosilyl groups of said second type, respectively.

17. The method of claim 1 wherein said first organosilane has the formula $$L_mSi(R'')_{3-m}R$$

wherein L is a catalyzed non-fluorine halogen, or NR$_2^{IV}$ or an R$^{IV}$-substituted sulfide or amido group wherein R$^{IV}$ is methyl, ethyl, phenyl, Si(R'')$_{3-m}$R, or when L is NR$_2^{IV}$, a cyclic amino group, m is 1–3, R'' is methyl, ethyl, or phenyl, and R is selected from hydrogen, allyl, vinyl, and Q wherein Q is (a) alkyl groups having less than twenty carbon atoms, (b) aryl groups having less than twenty carbon atoms, (c) CH$_2$CH$_2$C$_n$F$_{2n+1}$ wherein n is 1 or more, (d) —CH$_2$C$_p$H$_{2p}$CH$_2$SR', (e) —CH$_2$C$_p$H$_{2p}$CH$_2$NR'$_2$, (f) —CH$_2$C$_p$H$_{2p}$CH$_2$N(R') (CH$_2$)$_2$N(R')$_2$, (g) —CH$_2$C$_p$H$_{2p}$CH$_2$OCH$_2$CHCH$_2$, (h) 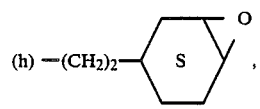

(i) —CH$_2$C$_p$H$_{2p}$CH$_2$OC(O)C(CH$_3$)=CH$_2$ (j) —CH$_2$C$_p$H$_{2p}$CH$_2$ 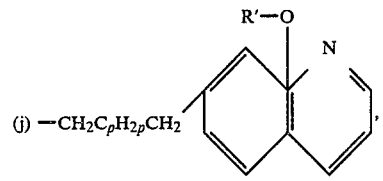

(k) —CH$_2$C$_p$H$_{2p}$CH$_2$O)$_a$Z wherein a is 0–10 and Z is an alkyl or aryl hydrocarbon having less than seven carbon atoms or is acetyl or is the group

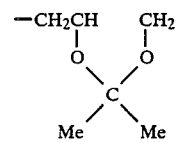

wherein Me is methyl, or (l) —CH$_2$c$_p$H$_{2p}$CH$_2$X wherein X is a halogen, R' is methyl, ethyl or phenyl and p is 1 or 2.

18. The method of claim 1 wherein said first organosilane is

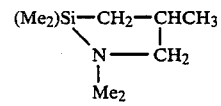

19. The method of claim 17 wherein said second organosilane is an organosilane different from said first organosilane and has the formula $$L_mSi(R'')_{3-m}R$$

wherein L is alkoxy, carboxy, or halogen, R'' is methyl ethyl or phenyl, m is 1–3, and R is selected from hydrogen, allyl, vinyl and Q wherein Q is (a) alkyl groups having less than twenty carbon atoms, (b) aryl groups having less than twenty carbon atoms, (c) CH$_2$CH$_2$C$_n$F$_{2n+1}$ wherein n is 1 or more, (d) —CH$_2$C$_p$H$_{2p}$CH$_2$SR', (e) —CH$_2$C$_p$H$_{2p}$CH$_2$NR'$_2$, (f) —CH$_2$C$_p$H$_{2p}$CH$_2$N(R')(CH$_2$)$_2$N(R')$_2$,

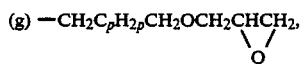
(g) —CH$_2$C$_p$H$_{2p}$CH$_2$OCH$_2$CHCH$_2$,

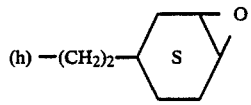
(h) —(CH$_2$)$_2$—

(i) —CH$_2$C$_p$H$_{2p}$CH$_2$OC(O)C(CH$_3$)=CH$_2$ or

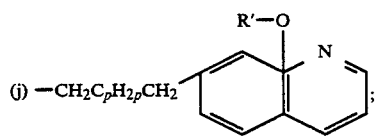
(j) —CH$_2$C$_p$H$_{2p}$CH$_2$—

(k) —CH$_2$C$_p$H$_{2p}$CH$_2$X wherein X is a halogen, R' is methyl, ethyl or phenyl and p is 1 or 2.

20. A method of silylating a porous material to form a silylated porous material having an external zone of external surfaces ranging from 0.5% to 50% of the surface area of the porous material and having an internal zone of internal surfaces ranging from 50–99.5% of the surface area of the porous material, comprising:

(a) providing a hydroxyl-bearing porous support selected from the group consisting of porous metalloid oxides, porous metallic oxides, and mixtures thereof, (b) providing an organosilane mixture of
  (i) 0.05 to 2.0 molecules per square nanometer of surface area of said porous support of a first organosilane having first organosilyl groups and having a leaving group which is selected from the group consisting of alkyl or aryl sulfide, disubstituted amino, and substituted amino groups and which is capable of reacting with the hydroxyls on the external surfaces faster than said first organosilane can migrate into the interior of said porous support, and
  (ii) more than 0.05 molecules per square nanometer of the surface area of said porous support of a second organosilane having second organosilyl groups and a leaving group which is selected from the group consisting of alkoxy, carboxy, and halogen groups and which will react slowly with the hydroxyls on the internal surfaces of said porous support but will not substantially exchange with the leaving group of said first organosilane said second organosilane being capable of diffusing into the interior of said porous support, (c) forming a porous support suspension by mixing said porous support with a solvent, (d) adding said organosilane mixture to said porous support suspension at a rate which is rapid with respect to the reaction rate of said second organosilane but slow with respect to the rate of mixing said suspension with said organosilane mixture, (e) maintaining contact between said porous support and said organosilane mixture for a time sufficient to permit rapid formation of said first organosilyl groups predominantly on the external surfaces of said porous support to form said external zone and said slow formation of said second organosilyl groups predominantly on the internal surfaces of said porous support to form said internal zone, and (f) subsequently isolating the so-treated porous support and thereby providing said silylated porous material.

21. The method of claim 20 wherein said porous support is particulate silica and said solvent is selected from the group consisting of hexane, octane, decane, toluene and mixtures thereof.

* * * * *